(12) United States Patent
Seibel (10) Patent No.: US 6,859,008 B1
(45) Date of Patent: Feb. 22, 2005

(54) METHOD AND APPARATUS FOR COMPENSATING FOR CABLE CHARGING EFFECTS ON CONTROL ALGORITHMS

(75) Inventor: Brian J. Seibel, Grafton, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 0 days.

(21) Appl. No.: 10/664,281

(22) Filed: Sep. 17, 2003

(51) Int. Cl.[7] ............................................. H02P 5/28
(52) U.S. Cl. ....................... 318/799; 319/798; 319/632
(58) Field of Search ................................ 318/632, 798, 318/799

(56) References Cited

U.S. PATENT DOCUMENTS

| | | | | |
|---|---|---|---|---|
| 5,550,450 A | * | 8/1996 | Palko et al. ................. | 318/800 |
| 5,689,169 A | | 11/1997 | Kerkman et al. ............ | 318/807 |
| 5,814,967 A | * | 9/1998 | Garces et al. ................ | 318/807 |
| 5,850,132 A | * | 12/1998 | Garces ......................... | 318/599 |
| 6,002,234 A | * | 12/1999 | Ohm et al. ................... | 318/729 |
| 6,690,139 B1 | * | 2/2004 | Seibel .......................... | 318/798 |

OTHER PUBLICATIONS

A High Performance Spped Control Scheme of Induction Motor Without Speed And Voltage Sensors, 1986 IEEE IAS Annual Meeting; pp 106–111, Okuyama et al.

Effects of Parasitics on The Control of voltage Source Inverters, IEEE–APEC 2001, Mar. 4–8, 2001; 10 pages, Kerkman et al.

Interaction Of Drive Modulation and Cable Parameters on AC Motor Transients, IEEE Transaction on Industry Applications, vol. 33, No. 3, May/Jun. 1997, pp. 722–731, Kerkman et al.

* cited by examiner

Primary Examiner—Rita Leykin
(74) Attorney, Agent, or Firm—Quarles & Brady LLP; William R. Walbrun (57) ABSTRACT

A method and apparatus for use with a three phase AC motor controller linked to a three phase motor, the controller receiving a torque command signal and generating a voltage phase angle as a function of the torque command signal, the voltage phase angle in turn used to generate modulating waveforms to drive a PWM inverter that provides voltages on three motor supply lines, the method comprising the steps of during a commissioning procedure, identifying at least one compensation angle that, when mathematically combined with the voltage phase angle, drives the motor to zero operating frequency when a zero torque command is received and, during normal operation and when a zero torque command is received, mathematically combining the compensation angle and the voltage phase angle to generate a compensated phase angle and using the compensated phase angle to generate the modulating waveforms.

32 Claims, 7 Drawing Sheets

METHOD AND APPARATUS FOR COMPENSATING FOR CABLE CHARGING EFFECTS ON CONTROL ALGORITHMS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The field of the invention is motor controllers and more specifically methods and apparatuses for correcting phase and magnitude errors in motor control signals that result from cable/supply line charging effects. will indicate a signal associated with a stator q-axis in a d-q frame of reference.

Throughout this specification a "*" will indicate a command signal, "ds" and "qs" subscripts will indicate signals associated with a stator q-axis in a d-q frame of reference, "u", "v" and "w" subscripts will indicate values associated with three separate motor phases also referred to as u, v and w phases, a "f" subscript will indicate a feedback signal, a "s" subscript will indicate a motor stator quantity, a "NP" subscript will indicate a name plate value, an "a" subscript will indicate an angle, a "mag" subscript will indicate a magnitude value, an "o" subscript will indicate an output value and a "pd" subscript will indicate a predetermined or target value.

Figure 1:
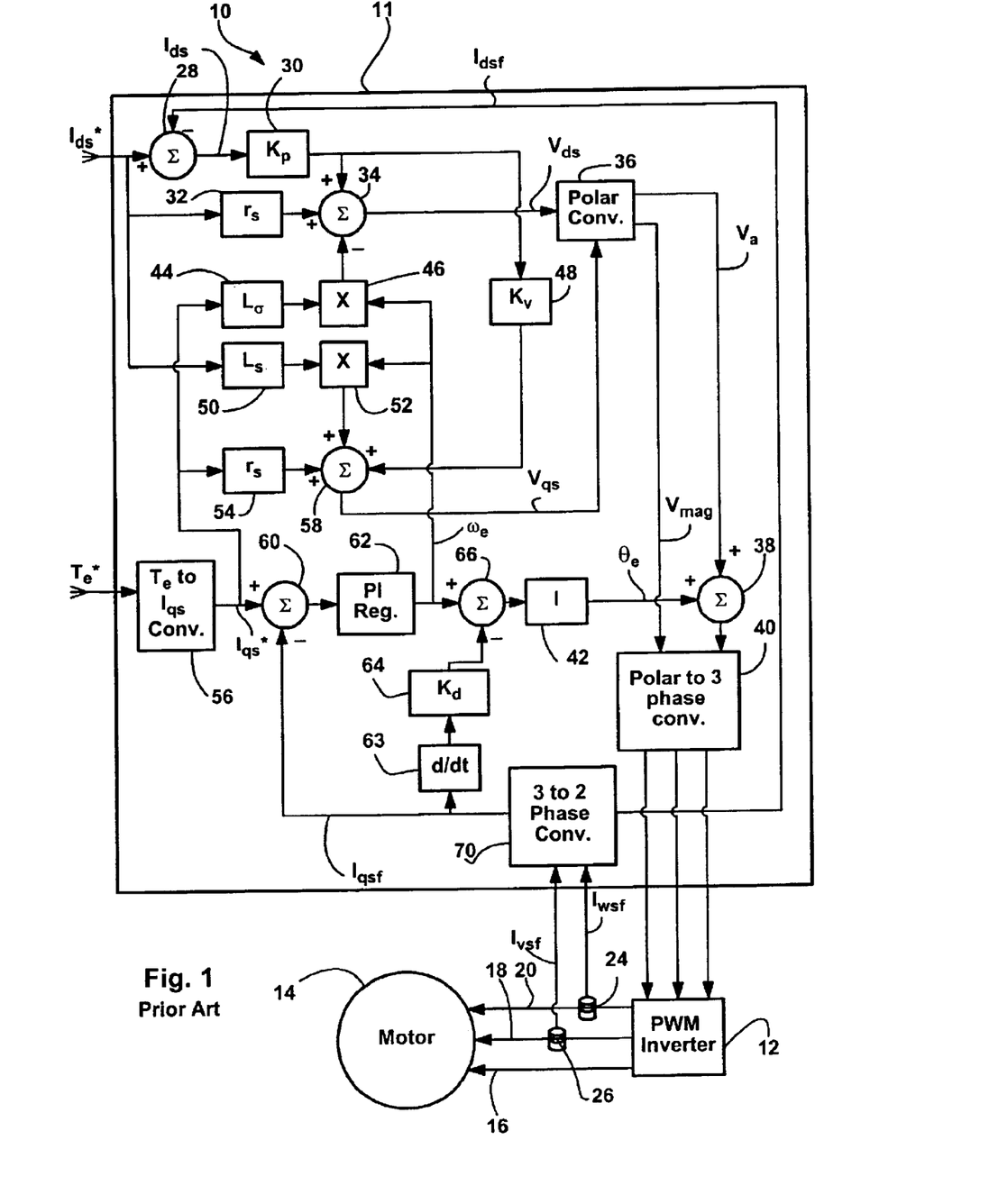
FIG. 1 is a diagram of a portion of a control system including the present invention linked to a motor.

Referring to FIG. 1, a diagram 10 of a motor 14 and associated field oriented control (FOC) system is illustrated where the system includes a controller 11 and a pulse width modulating (PWM) inverter 12 linked to motor 14 via three voltage supply lines/cables 16, 18 and 20. In addition, simplified system 10 includes two input lines for supplying a command d-axis current $I_{ds}^*$ and a torque command value or signal $T_e^*$ and two current sensors 22 and 24 that sense currents on lines 18 and 20 and provide feedback currents $I_{vf}$ and $I_{wf}$ to controller 11.

Generally, controller 11 is programmed to receive the command values $T_e^*$ and $I_{ds}^*$ and use those values to generate voltages on supply lines 16, 18 and 20 that cause motor 14 to rotate in a manner that is consistent with the input command values. Feedback signals $I_{vf}$ and $I_{wf}$ form a closed loop that helps to drive motor 14 in the intended fashion. To this end, feedback signals $I_{vf}$ and $I_{wf}$ are converted into signals that can be compared to either the command signals or to derivatives of the command signals. Any differences between the commanded operating parameters and the feedback parameters are used to alter voltages applied across the supply lines appropriately. Thus, motor 14 rotates when a suitable torque command $T_e^*$ and d-axis current command $I_{ds}^*$ are provided. Similarly, torque command $T_e^*$ may be set to zero and mechanical losses will then halt motor rotation.

As well known in the controls art, voltage equations in a d-q frame of reference can be expressed as follows:

$$V_{qs} = r_s I_{qs} + \omega_e L_s I_{ds} + d\lambda_{qs}/dt \qquad \text{Eq. 1}$$

$$V_{ds} = r_s I_{ds} - \omega_e L_o I_{qs} + d\lambda_{ds}/dt \qquad \text{Eq. 2}$$

where $r_s$ is a stator resistance value, $\omega_e$ is a command frequency, $L_s$ is a stator inductance, $L_o$ is a leakage inductance, $\lambda_{qs}$ and $\lambda_{ds}$ are flux values and $I_{qs}$ and $I_{ds}$ are q and d-axis currents, respectively.

Referring still to FIG. 1, the detail shown in controller 11 represents a common control algorithm for implementing Equations 1 and 2 above. To this end, controller 11 includes six summers 28, 34, 60, 58, 66 and 38, scalar gain values represented by blocks 30, 32, 44, 50, 54, 48 and 64, two multipliers 46 and 52, a torque to q-axis current converter 56, a proportional-integral (PI) regulator 62, an integrator 42, a polar converter 36, a polar to three phase converter 40 and a 3 to 2 phase converter 70.

Converter 70 receives feedback current signals $I_{vf}$ and $I_{wf}$ from line current sensors 24 and 26, uses the two received signals to determine the current in the third line 16 and converts the three phase currents to two phase d and q-axis feedback currents $I_{dsf}$ and $I_{qsf}$, respectively. D-axis current $I_{dsf}$ is provided to summer 28 and q-axis current $I_{qsf}$ is provided to summer 60 and also to derivative with respect to time block 63.

D-axis command current $I_{ds}^*$ is provided to summer 28 and the feedback current $I_{dsf}$ is subtracted therefrom to generate a d-axis current error signal $I_{dse}$ that is provided to and scaled by gain block 30. The scaled value generated by gain block 30 represents the change in d-axis flux with respect to time (i.e., the third term $d\lambda_{ds}/dt$ in Equation 2 above). The output of gain block 30 is provided to each of summer 34 and gain block 48.

Gain block 48 scales the received value thereby generating a value that represents the change in q-axis flux with respect to time (i.e., the third term $d\lambda_{qs}/dt$ in Equation 1 above) which is provided to summer 58. Command current $I_{ds}^*$ is also provided to stator resistance gain block 32 and to stator inductance gain block 50, the outputs of which are provided to summer 34 and multiplier block 52, respectively.

Command torque value $T_e^*$ is provided to converter 56 and, as the label implies, converter 56 converts command torque value $T_e^*$ to a q-axis command current value $I_{qs}^*$. Command current value $I_{qs}^*$ is provided to each of leakage inductance gain block 44, stator resistance gain block 54 and summer 60. The outputs of blocks 44 and 54 are provided to multiplier 46 and summer 58, respectfully.

Summer 60 subtracts q-axis current feedback value $I_{qsf}$ from command current value $I_{qs}^*$ to generate a q-axis current error value that is provided to regulator 62. Regulator 62 scales the received error signal to generate a command frequency value $\omega_e$ which is provided to each of multipliers 46 and 52 and summer 66.

Multiplier 46 multiplies the received values from block 44 and regulator 62 and provides its output to summer 34. Consistent with Equation 2 above, summer 34 subtracts value $\omega_e L_o I_{qs}$ (i.e., the output of multiplier 46) from the sum of the output values from gain blocks 32 and 30 to generate a d-axis voltage value $V_{ds}$. Voltage value $V_{ds}$ is provided to polar converter 36. Similarly, multiplier 52 multiplies the values received from block 50 and regulator 62 and provides its output to summer 58. Summer 58 adds the received values to generate q-axis voltage value $V_{qs}$ which is provided to polar converter 36.

Converter 36 converts the d and q-axis voltage values to a voltage magnitude signal $V_{mag}$ and a voltage angle signal $V_a$. Magnitude signal $V_{mag}$ is provided to polar to three phase converter 40 and angle signal $V_a$ is provided to summer 38.

Referring still to FIG. 1, block 63 takes the derivative of feedback current $I_{qsf}$ thereby generating a compensation frequency in radians per second which is scaled by gain $k_d$ at block 64. Summer 66 subtracts the scaled derivative of the q-axis feedback current value generated by block 64 from the output of regulator 62 and provides its output value to integrator 42. Integrator 42 integrates the received value to provide an electrical angle θe to summer 38. Summer 38 adds the voltage angle $V_a$ and the electrical angle θe and provides its output to converter 40. Converter 40 converts the received magnitude value $V_{mag}$ and adjusted angle value to three phase command values that are used to drive PWM inverter 12.

Methods for determining inductance values $L_s$ and $L_o$ are known in the art and will not be explained here in detail. Resistance value $r_s$ is typically determined during a commissioning procedure by driving motor 14 with a name plate current $I_{NP}$ at zero electrical frequency using both the d and q-axis current regulators, measuring an auto-tune voltage value $V_{at1}$ (e.g., the output of a closed loop current regulator) and then solving the following equation:

$$r_s = V_{at1}/I_{NP} \quad \text{Eq. 3}$$

After determining resistance value $r_s$, that value is stored for subsequent use during motor control.

According to some control algorithms d-axis command current value $I_{ds}^*$ is determined during a commissioning procedure by disconnecting the motor load from motor 14 and operating controller 11 at some reasonable operating frequency such as 75% of the rated motor name plate frequency. The resulting motor current is the no-load value of $I_{ds}^*$.

As well known in the motor control art, PWM inverters like inverter 12 include a plurality of switching devices that are controlled by controller 11 to generate voltage waveforms on supply cables 16, 18 and 20. With the advent of high speed switching devices and associated advantages, most power electronic inverters are now controlled so as to switch at very high speeds. Unfortunately, when high frequency switching is used to drive a motor 14 through relatively long cables (e.g., several hundred feet), parasitic capacitance within the cables 16, 18 and 20 becomes significant. In fact, depending on the magnitude of the characteristic impedance of a cable configuration and system grounding, inverter 12 may have to provide a significant amount of energy to cables 16, 18 and 20 just to charge and discharge the cable capacitance. For a detailed explanation of cable charging and discharging phenomenon at high PWM switching frequencies see R. Kerkman, D. Leggate, G Skibinski, "Interaction of Drive Modulation and Cable Parameters on AC Motor Transients", IEEE Transactions on Industry Applications, Vol. 33, No. 3, May/June 1997, pp. 722–731.

Experience has shown that cable charging and discharging will, under certain circumstances, alter the switching characteristics of the power switching devices in PWM inverter 12. To this end, referring again to FIG. 1, it has been observed that, where cables 16, 18 and 20 are long (e.g., 500 feet) so that associated capacitance is appreciable, the feedback currents $I_{vf}$ and $I_{wf}$ at motor 14 (e.g., where the current sensors are located) are different than the currents provided by inverter 12 to the cables.

After cables 16, 18 and 20 become charged, the charged cables often generate unintended currents at the motor ends of the cables that are sensed by feedback sensors 24 and 26 and which end up hampering control efforts. At normal operating frequencies, while this phenomenon occurs, the distorting effect is relatively minimal due to the magnitude differences between the capacitive charge currents and the intended/generated currents. At low speeds, however, the distorting effects have larger relative magnitude, are more noticeable and have adverse effects on control. Specifically, when the torque command $T_e^*$ is set to zero to stop motor 14, it has been observed that the feedback currents cause controller 11 to continue to generate non-zero torque and hence it is difficult to drive the motor to a stopped condition.

Figure 2:
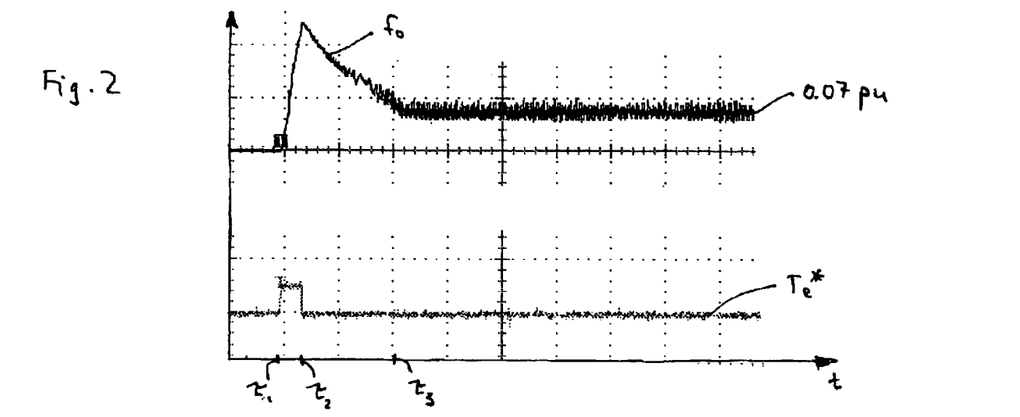
FIG. 2 is a graph illustrating a torque command signal that may be provided to the controller of FIG. 1 and a resulting output frequency signal where the inventive compensation system is not employed.

In this regard see FIG. 2 where two system characteristics are illustrated that were generated using a control algorithm similar to that illustrated in FIG. 1 with a 5 HP, 460 Volt AC, 4 pole motor and 11.0 Arms inverter with 600 feet of shielded motor cables 16, 18 and 20. The characteristics in FIG. 2 include a torque command value $T_e^*$ and a resulting per unit operating or motor frequency $f_o$. It can be seen that at time $\tau_1$ a step torque command is provided and frequency $f_o$ begins to rise as expected. At time $\tau_2$, torque command signal $T_e^*$ is set equal to zero and frequency $f_o$ begins to drop toward a zero value. However, at approximately time $\tau_3$, despite the zero torque value, output frequency $f_o$ levels off at approximately 0.07 p.u.

Inability to reach a zero frequency after cable charging occurs is exacerbated by a d-axis command voltage error that is associated with the cable charging phenomenon described above. To this end, when torque command signal $T_e^*$ is zero, Equations 1 and 2 above can be simplified as:

$$V_{qs} = \omega_e L_s I_{ds} + d\lambda_{qs}/dt \quad \text{Eq. 4}$$

$$V_{ds} = r_s I_{ds} \quad \text{Eq. 5}$$

Examining equations 4 and 5 it should be appreciated that with a zero torque command value, the applied voltage is dominated by the stator resistance drop and the correct value of $I_{ds}$. Thus, under test conditions with long cables and zero torque command, the open loop applied voltage in both the d-axis and the q-axis depend on the d-axis voltage resulting in the correct value of $I_{ds}$.

Referring still to Equation 5, as indicated above, resistance value $r_s$ is determined during a commissioning procedure using the rated motor name plate current. Importantly, the commissioning test for stator resistance value $r_s$ described above uses both the d and q-axis current regulators to identify resistance value $r_s$. The control method for normal system operation does not use both regulators and therefore actual values of d and q-axis currents cannot be forced to be identical to the commanded values. As discussed above, the cable charging effects distort the applied voltages on the motor terminals resulting in d-axis feedback current $I_{dsf}$ that is generally greater than d-axis command current value $I_{ds}^*$ at low operating frequencies without both the d and q-axis current regulators. Thus, the system described above generates an incorrect voltage value $V_{ds}$.

In addition to the effects of charging on long cables it is also believed that other drive operating characteristics can have exacerbating effects on the $V_{ds}$ error. For instance, there is at least some evidence that non-ideal power device characteristics may add to the $V_{ds}$ error described above.

BRIEF SUMMARY OF THE INVENTION

It has been recognized that, while the effects of charging on long cables occur at all operating frequencies, the relative magnitude of the effects on operating frequency are much greater and are relatively easily discernable at low operating frequencies and, indeed are determinable under zero torque command conditions. Thus, compensation angle for the voltage phase angle can be identified during a commissioning procedure by providing a zero torque command and, after the operating frequency reaches a steady state (e.g., deceleration stops), adjusting a compensation angle until the frequency is zero and then storing the adjusted compensation angle.

The invention includes a method for use with a three phase AC motor controller linked to a three phase motor, the controller receiving a torque command signal and generating a voltage phase angle as a function of the torque command signal, the voltage phase angle in turn used to generate modulating waveforms to drive a PWM inverter that provides voltages on three motor supply lines, the method comprising the steps of during a commissioning procedure, identifying at least one compensation angle that, when mathematically combined with the voltage phase angle, drives the motor to zero operating frequency when a zero torque command is received and, during normal operation and when a zero torque command is received, mathematically combining the compensation angle and the voltage phase angle to generate a compensated phase angle and using the compensated phase angle to generate the modulating waveforms.

In at least some embodiments the step of identifying a compensation angle includes driving the motor at a normal operating frequency, setting the torque command signal to zero, monitoring the motor frequency, when the motor stops decelerating, modifying the voltage phase angle until the motor frequency reaches zero and identifying the value by which the motor angle was modified to achieve zero speed as the compensation angle. Moreover, in some cases the step of modifying the voltage phase angle includes, when deceleration stops a) determining the operating frequency, b) negating the operating frequency to generate a frequency error value, c) integrating the frequency error value to generate an instantaneous compensation angle, d) mathematically combining the instantaneous compensation angle and the voltage phase angle to generate a compensated phase angle, e) using the compensated phase angle to drive the motor; and f) repeating steps (a) through (e) until the operating frequency is zero.

In some embodiments the controller also generates d and q-axis voltage values as a function of the torque command signal and uses the d and q-axis voltage values to generate the voltage phase angle. Here, in some cases, the method is also for altering the d-axis voltage value to compensate for the effects of supply line capacitive charge on the d-axis voltage, the method further including the steps of mathematically combining the d-axis voltage value with a compensation factor to generate a compensated d-axis voltage value and using the compensated d-axis voltage value along with the q-axis voltage value to generate the voltage phase angle. Here, prior to normal operation and during a commissioning procedure, the method may include identifying the compensation factor and storing the compensation factor for use during normal operation. In one case the step of identifying the compensation factor includes driving the controller with a name plate current and measuring a first d-axis auto-tune voltage, identifying a no load d-axis current, driving the controller with the no load d-axis current and measuring a second d-axis auto-tune voltage and mathematically combining the first and second auto-tune voltages to generate the compensation factor. Here the step of mathematically combining the first and second auto-tune voltages may include dividing the second d-axis auto-tune voltage by the first d-axis auto-tune voltage and the step of mathematically combining the d-axis voltage value with a compensation factor to generate a compensated d-axis voltage value may include multiplying the compensation factor and the d-axis voltage value to generate the compensated d-axis voltage value.

The invention also includes an apparatus for use with a three phase AC motor controller linked to a three phase motor, the controller receiving a torque command signal and generating a voltage phase angle as a function of the torque command signal, the voltage phase angle in turn used to generate modulating waveforms to drive a PWM inverter that provides voltages on three motor supply lines, the apparatus comprising a processor running a program to perform the steps of, during a commissioning procedure, identifying at least one compensation angle that, when mathematically combined with the voltage phase angle, drives the motor to zero operating frequency when a zero torque command is received and, during normal operation and when a zero torque command is received, mathematically combining the compensation angle and the voltage phase angle to generate a compensated phase angle and using the compensated phase angle to generate the modulating waveforms.

In some cases the processor performs the step of identifying a compensation angle by driving the motor at a normal operating frequency, setting the torque command signal to zero, monitoring the motor frequency, when the motor stops decelerating, modifying the voltage phase angle until the motor frequency reaches zero and identifying the value by which the motor angle was modified to achieve the zero speed as the compensation angle. Here, the processor may perform the step of modifying the voltage phase angle by, when deceleration stops: a) determining the operating frequency, b) negating the operating frequency to generate a frequency error value, c) integrating the frequency error value to generate an instantaneous compensation angle, d) mathematically combining the instantaneous compensation angle and the voltage phase angle to generate a compensated phase angle, e) using the compensated phase angle to drive the motor and f) repeating steps (a) through (e) until the operating frequency is zero.

In addition, the invention includes a method for use with a three phase AC motor controller linked to a three phase motor, the controller receiving a torque command signal and generating a voltage phase angle as a function of the torque command signal, the voltage phase angle in turn used to generate modulating waveforms to drive a PWM inverter that provides voltages on three motor supply lines, the method comprising the steps of during a commissioning procedure: a) driving the motor at a normal operating frequency, b) setting the torque command signal to zero, c) monitoring the motor frequency and, when the motor stops decelerating i) determining the operating frequency, ii) negating the operating frequency to generate a frequency error value, iii) integrating the frequency error value to generate an instantaneous compensation angle, iv) mathematically combining the instantaneous compensation angle and the voltage phase angle to generate a compensated phase angle, v) using the compensated phase angle to drive the motor and vi) repeating steps (i) through (v) until the operating frequency is zero, d) identifying the value by which the motor angle was modified to achieve the zero speed as a compensation angle and during normal operation and when a zero torque command is received: e) mathematically combining the compensation angle and the voltage phase angle to generate a compensated phase angle and f) using the compensated phase angle to generate the modulating waveforms.

Here, the step of modifying the phase angle may include modifying the phase angle whenever any torque command is received.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIGS. 4(a) and 4(b) illustrate a flow chart according to one method of, the present invention, wherein

DETAILED DESCRIPTION OF THE INVENTION

At least some embodiments of the present invention include two separate sub-processes including a first sub-process to identify a d-axis voltage correction factor $\zeta$ and a second sub-process to identify a voltage compensation angle $\delta$. The sub-processes will first be described separately and then in conjunction. The first sub-process does not require additional or special hardware to identify factor $\zeta$ and therefore can be described without reference to any figures.

To compensate the d-axis voltage command $V_{ds}$ for errors at low frequencies due to the commissioned value of resistance $r_s$ and command current $I_{ds}$ and the effects of cable charging with long lines, a correction factor $\zeta$ is identified by performing three steps. First, during the commissioning procedure to identify resistance value $r_s$, the measured auto-tune voltage when motor NP current is used to drive the load is stored as autotune voltage value $V_{at1}$. Second, after the no-load d-axis command current value $I_{ds}^*$ is identified, value $I_{ds}^*$ is used to drive the system and a second auto-tune voltage value $V_{at2}$ is measured (e.g., the output of a closed loop current regulator is measured). Next, the second auto-tune voltage value $V_{at2}$ is divided by the first auto-tune voltage value $V_{at1}$ to generate correction factor $\zeta$. Correction factor $\zeta$ is stored in a memory (see 121 in FIG. 5) for subsequent use.

Figure 3:
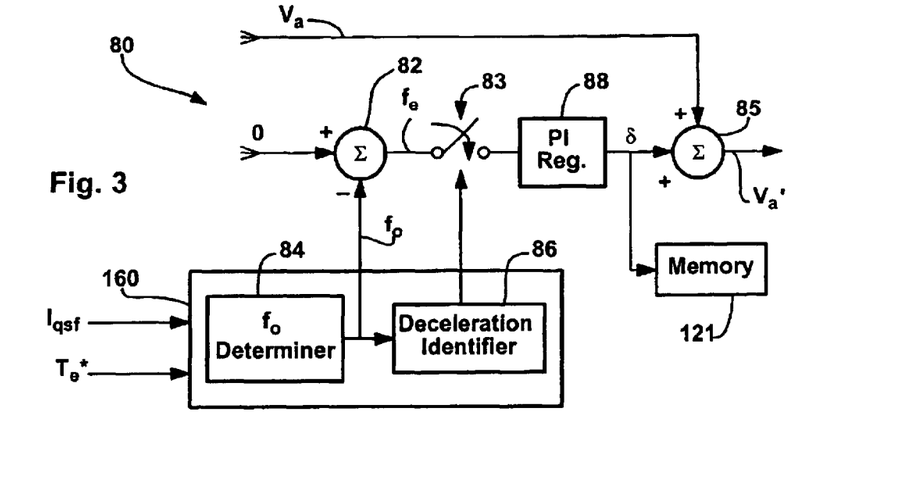
FIG. 3 is a schematic diagram illustrating a voltage angle compensator according to the present invention.

Referring now to the drawings wherein like reference numerals correspond to similar elements throughout the several views and, more specifically, referring to FIG. 3, an exemplary assembly 80 for identifying compensation angle $\delta$ is illustrated. Assembly 80 is added to controller 11 in FIG. 1 during a commissioning procedure and receives three signals including voltage angle value $V_a$, q-axis feedback current $I_{qsf}$ and torque command value $T_e^*$. Assembly 80 includes summers 82 and 85, a single pole, double throw switch 83, a proportional-integral (PI) regulator 88 and a system observer 160. System observer 160 in turn includes a frequency determiner 84 and a deceleration identifier 86.

Observer 160 receives two input values including the q-axis feedback current value $I_{qsf}$ and the command torque value $T_e^*$ and operates during a commissioning procedure to perform two functions. First, observer 160 determines system output frequency $f_o$ (e.g., motor frequency). Second, observer 160 determines when the output frequency stops decelerating after a zero command torque value $T_e^*$ is provided. To determine frequency $f_o$, observer 160 includes a frequency determiner 84 that uses q-axis feedback current value $I_{qsf}$ to determine the instantaneous motor operating frequency $f_o$ as well known in the art. Other ways to determine frequency $f_o$ (e.g., a commissioning encoder, etc.) are contemplated and the present invention should not be limited by how frequency $f_o$ is determined.

The output value $f_o$ is provided to each of summer 82 and identifier 86. Identifier 86 compares an instantaneous or filtered output frequency $f_o t(n)$ to a previous output frequency value $f_o t(n-1)$ when the command torque value $T_e^*$ is zero and, when the two values match, generates a switch control signal that is provided to switch 83.

Summer 82 subtracts output frequency value $f_o$ from a zero value and generates an error output frequency value $f_e$. The output of summer 82 is provided to switch 83. Switch 83 is normally open and, when a control signal is received from identifier 86, switch 83 closes thereby providing the error output frequency $f_e$ to PI regulator 88. Regulator 88 scales the received value thereby generating compensation angle $\delta$. Compensation angle $\delta$ is provided to summer 85 which also receives polar angle $V_a$ (see again FIG. 1). Summer 85 adds compensation angle $\delta$ to angle $V_a$ and generates a corrected angle value $V'_a$ which is provided in FIG. 1 to summer 38. Thus, generally, during the second commissioning sub-process, when a zero torque command $T_e^*$ is provided to controller 11, once motor 14 stops decelerating, switch 83 is closed and frequency value $f_e$ is scaled to generate compensation angle $\delta$. Compensation angle $\delta$ is increased or decreased until output frequency $f_o$ is zero (i.e., motor 14 stops). Value $\delta$ is stored in memory 121 (see FIG. 5) for subsequent use.

Figure 4A:
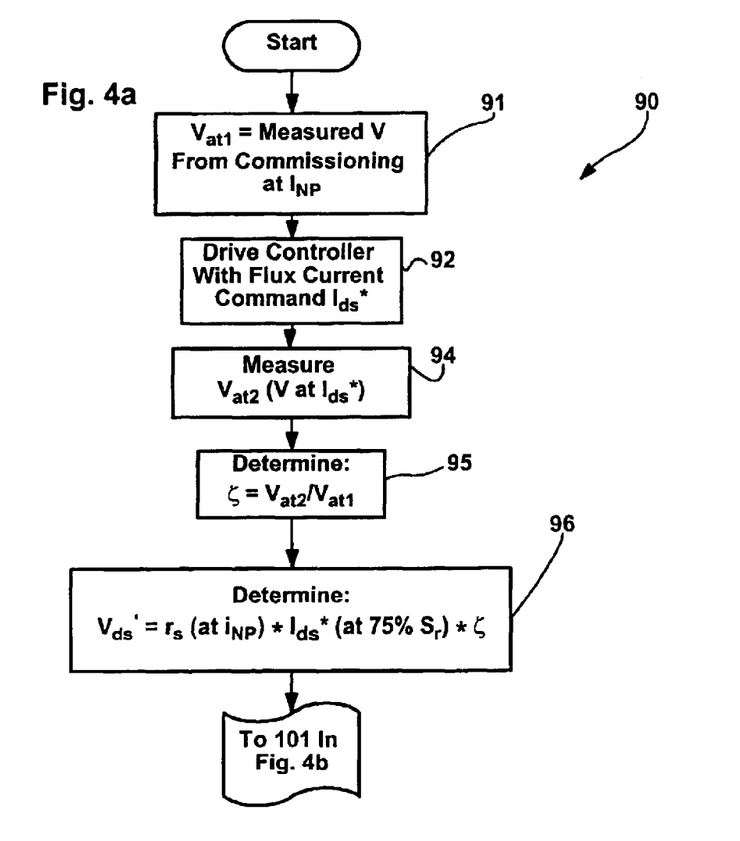
FIG. 4(a) illustrates a sub-method for identifying a d-axis voltage scalar value that compensates for control irregularities related to commissioned values of stator resistance and d-axis command current and FIG. 4(b) illustrates a sub-method for identifying a compensation angle for compensating for long cable charging effects.
Figure 4B:
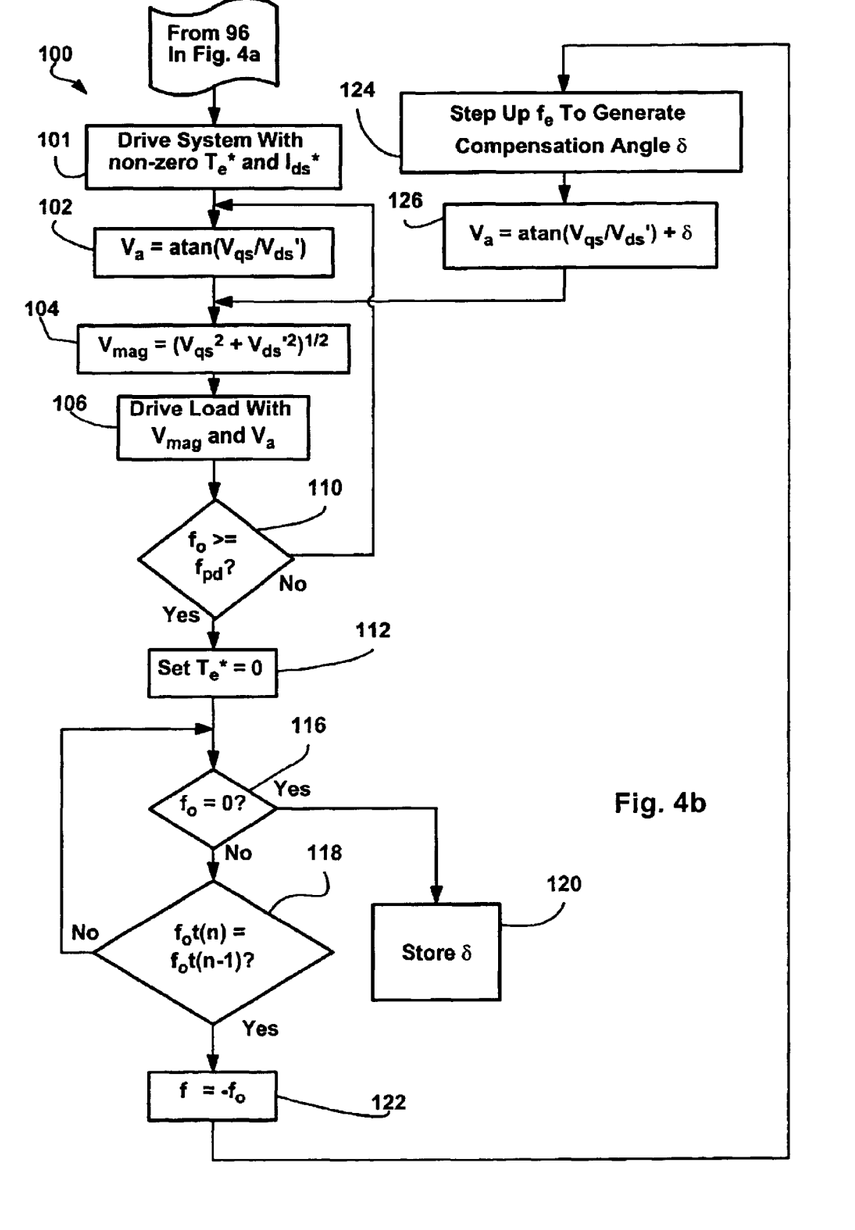

Referring now to FIGS. 4(a) and 4(b), a more detailed method 90 consistent with the comments above is illustrated. In FIG. 4(a), beginning at block 91, first auto-tune voltage value $V_{at1}$ is stored during the commissioning procedure to identify resistance value $r_s$. Next, at block 92, flux current command $I_{ds}^*$ is used to drive controller 11 and, at block 94, the voltage on the output of the current regulator is measured to identify second auto-tune voltage $V_{at2}$. At block 95, a d-axis voltage correction factor $\zeta$ is identified by dividing auto-tune voltage $V_{at2}$ corresponding to the flux current $I_{ds}*$ by auto-tune voltage $V_{at1}*$ corresponding to the nameplate current. Correction value $\zeta$ is stored at block 95.

After block 95, control passes to block 96. Correction factor $\zeta$ is used to modify the d-axis voltage value $V_{ds}$ during the second commissioning sub-process. To this end, referring to FIGS. 5 and 6 and again to FIG. 1, a $V_{ds}$ compensator 69 is linked to memory 121 to receive value $\zeta$ and includes multiplier 154. Multiplier 154 receives value $\zeta$ and, at block 96, multiplies the d-axis voltage value $V_{ds}$ from summer 34 in FIG. 1 by factor $\zeta$ to compensate for the d-axis voltage error as described above. The output $V'_{ds}$ of multiplier 154 is provided to polar converter 156.

Referring to FIG. 4(b), with factor $\zeta$ stored and compensator 69 activated, at block 101, a non-zero torque command value $T_e*$ and flux current value $I_{ds}*$ are provided to controller 11 to drive motor 14. Controller 11 uses the command values and feedback current values to generate q and d-axis voltage command signals $V_{qs}$ and $V_{ds}$, respectively. Q-axis value $V_{qs}$ is provided directly to polar converter 36. D-axis value $V_{ds}$, as illustrated, is provided to $V_{ds}$ compensator 69 to generate compensated value $V'_{ds}$.

At block 102, converter 36 identifies voltage angle $V_a$ by taking the arc tangent of the ratio of the q-axis voltage command value $V_{qs}$ divided by the d-axis voltage value $V'_{ds}$. In addition, at block 104, polar converter 36 identifies the magnitude $V_{mag}$ of a polar voltage corresponding to the q-axis command voltage and value $V'_{ds}$ by taking the square root of the sum of the squares of voltages $V_{qs}$ and $V'_{ds}$. At block 106, the magnitude and angle values $V_{mag}$ and $V_a$ are used to drive motor 14 (e.g., compensator 71 is not yet activated).

At block 110, output frequency $f_o$ is monitored and compared to a predetermined or target frequency $f_{pd}$ which, for instance, may be 25% of the rated operating frequency. Where frequency $f_o$ is not equal to or greater than the predetermined frequency $f_{pd}$, control passes back up to block 102 where the voltage angle and magnitude signals are recalculated and used to drive motor 14. The loop including blocks 102, 104, 106 and 110 is repeated until output frequency $f_o$ is greater than or equal to the predetermined frequency $f_{pd}$ at which point control passes to block 112.

At block 112, command torque $T_e*$ is set equal to zero. At block 116 in FIG. 3, frequency $f_o$ is compared to zero. At block 118, deceleration identifier 86 determines whether or not motor 14 has stopped decelerating by comparing consecutive output frequency values $f_o t(n-1)$ and $f_o t(n)$. Where motor 14 is continuing to decelerate, control passes back up to block 116 and the loop including blocks 116 and 118 continues. At block 118, once system deceleration stops, control passes to block 122. Referring also to FIG. 3, at block 122, the frequency error $f_e$ (i.e., the negated output frequency $f_o$) is provided to PI regulator 88 by closing switch 83.

After block 122, control passes to block 124 where frequency error $f_e$ is scaled to generate compensation angle $\delta$. At block 126, the voltage angle $V_a$ is recomputed by adding compensation angle $\delta$ to the newly computed arc tangent of ratio $V_{aqs}/V'_{ds}$. After block 126 control passes again to block 104 where voltage magnitude $V_{mag}$ is determined and then loops back down through the lower part of the flow chart as illustrated.

Referring once again to block 116, eventually, as the magnitude of compensation angle $\delta$ is increased or decreased, output frequency $f_o$ is driven toward and reaches zero. When output frequency $f_o$ is zero, control passes from block 116 to block 120 where compensation angle $\delta$ is stored in memory 121 for use.

Referring again to FIG. 5, according to at least one embodiment of the invention, the components in FIG. 5 are added (e.g., typically through modification to software) to the components of FIG. 1 and values $\delta$ and $\zeta$ are set as described above. The components of FIG. 5 include previously described memory 121 and $V_{ds}$ compensator 69 that receives the $V_{ds}$ value from summer 34 (see again FIG. 1) and value $\zeta$ and multiplies those values to generate modified $V'_{ds}$ value that is provided to polar converter 156. In addition, FIG. 5 also includes voltage angle compensator 71 that is linked to memory 121 to receive compensation angle $\delta$ and includes a summer 162. Summer 162 receives the voltage angle $V_a$ from converter 156 and adds angle $\delta$ to angle $V_a$ to generate a modified or compensated voltage angle value $V'_a$. $V'_a$ is provided to summer 38 during normal system operation.

Figure 5:
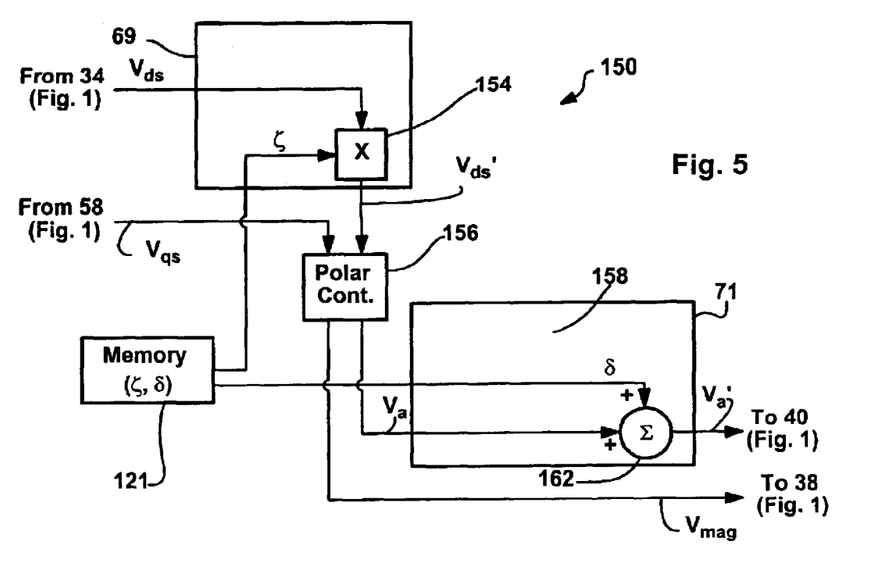
FIG. 5 is a subassembly showing some detail of functional blocks in FIG. 1 consistent with the present invention.
Figure 6:
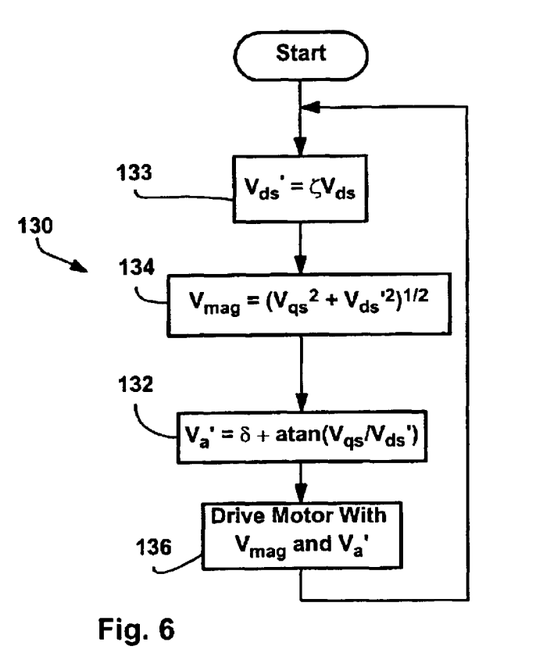
FIG. 6 is a flow chart for use with a controller including the components of FIGS. 1 and 5.

Referring now to FIG. 6, a method for use with controller 11 of FIG. 1 including the compensators of FIG. 5 is illustrated. In FIG. 6, it is assumed that, initially, a d-axis command current value $I_{ds}*$ and a non-zero torque command value $T_e*$ are provided to controller 11 so that motor 14 is being driven at some operating frequency. At block 133, the d-axis voltage compensator 69 multiplies compensator factor $\zeta$ by the d-axis voltage value $V_{ds}$ to generate the compensated d-axis voltage $V'_d$. At block 134 converter 36 identifies magnitude value $V_{mag}$ as the square root of the sum of the squares of value $V_{qs}$ and value $V'_{ds}$. In addition, at block 134 converter 36 identifies angle $V_a$ as the arc tangent of ratio $V_{qs}/V'_{ds}$. At block 132, compensator 71 adds compensator angle $\delta$ to voltage angle $V_a$ to generate compensated voltage angle $V'_a$. At block 136 magnitude $V_{mag}$ and angle $V'_a$ values are provided to converter 40 and summer 38, respectively, and hence are used to drive motor 14. The process of FIG. 6 is repeated.

Figure 7:
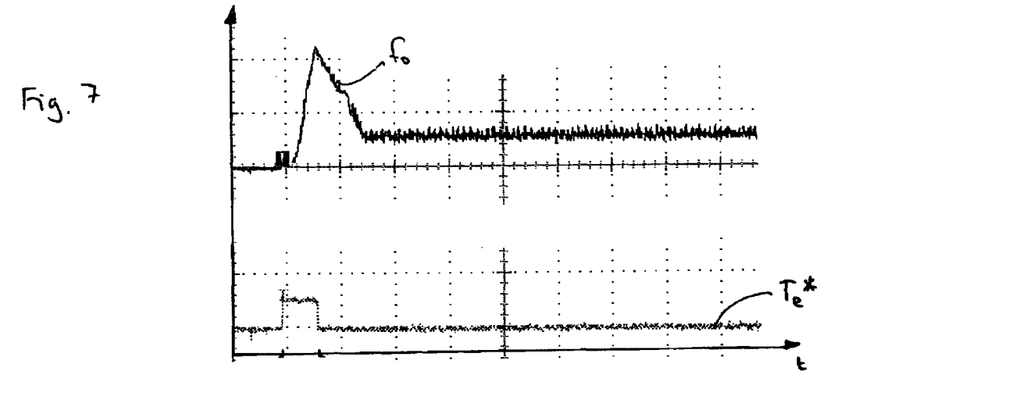
FIG. 7 is similar to FIG. 2, albeit illustrating waveforms generated where the inventive voltage magnitude compensation method has been activated.

Referring now to FIG. 7, exemplary waveforms similar to the waveforms described above with respect to FIG. 2 are illustrated, included an output frequency waveform $f_o$ and a torque command waveform $T_e*$. The waveforms in FIG. 7 were generated with a system similar to the system used to generate the waveforms in FIG. 2 except that the d-axis voltage correcting sub-method of the present invention (e.g., FIG. 4(a) and compensator 69) was activated (i.e., compensator angle $\delta$ portion of the present invention was disabled). As illustrated, the d-axis voltage correction sub-method reduced the output frequency error from 0.07 p.u. to approximately 0.06 p.u. Thus, d-axis voltage correction alone is useful but not sufficient to fully compensate for cable charging effects.

Figure 8:
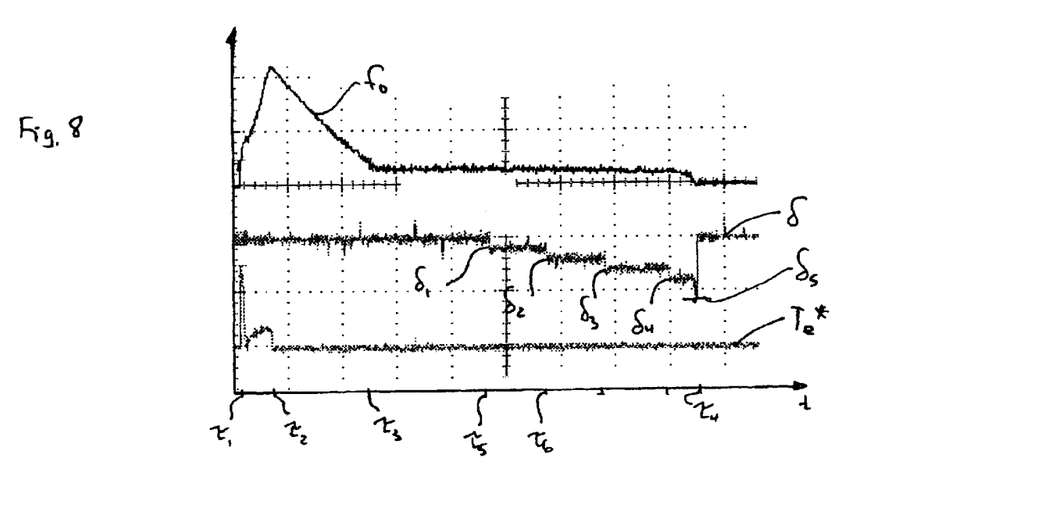
FIG. 8 is similar to FIG. 2 albeit including a third waveform corresponding to a compensation angle generated via the angle compensation identification method of the present invention and wherein the angle compensation identification method is activated.

Referring to FIG. 8, waveforms generated during a commissioning procedure with a system like the system described above with respect to FIG. 2 are illustrated where the angle compensation sub-method of the present invention was activated. In FIG. 8, like FIG. 2, an output frequency waveform $f_o$ and a torque command waveform $T_e*$ are illustrated. In addition, a compensation angle waveform $\delta$ is illustrated. As in FIG. 2, at time $\tau_1$ a non-zero torque command $T_e*$ is provided which causes output frequency $f_o$ to increase. At time $\tau_2$ the torque command $T_e*$ is set to zero and output frequency $f_o$ begins to decrease. At approximately time $\tau_3$, prior to the output frequency reaching a zero value, output frequency $f_o$ levels off. Once output frequency $f_o$ levels off, the compensation angle $\delta$ generated by PI regulator 88 in FIG. 3 begins to decrease. Eventually, at approximately $\tau_3$, compensation angle $\delta$ reaches a level that causes output frequency $f_o$ to be driven to a zero value. Thus, the correction value δ corresponding to $\tau_4$, is stored for subsequent use.

Figure 9:
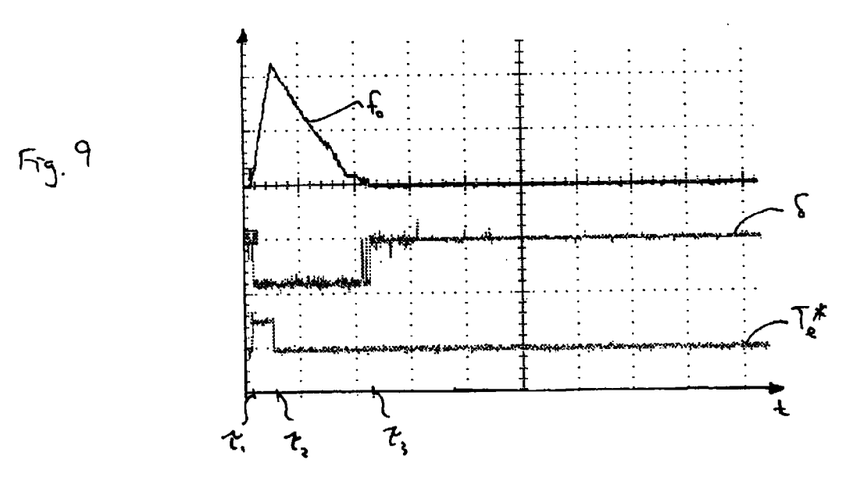
FIG. 9 is similar to FIG. 8, albeit illustrating the operating frequencies, correction angle and command torque waveforms during operation of one embodiment of the inventive method.

FIG. 9 is similar to FIG. 8, albeit illustrating waveforms generated during normal system operation (i.e., post commissioning) where both the angle and voltage magnitude compensators have been enabled. In FIG. 9, at time $\tau_1$, a non-zero torque command $T_e^*$ is used to drive controller 11. When command value $T_e^*$ is provided, frequency $f_o$ rises. In addition, compensator angle δ is added to the voltage angle $V_a$ to generate compensated voltage angle $V'_a$ (i.e., the angle compensator is activated). At time $\tau_2$ torque command value $T_e^*$ is set to zero and frequency $f_o$ begins to decrease. While frequency $f_o$ is decreasing the angle compensator remains activated. Eventually and generally in a linear fashion with minimal leveling off of frequency $f_o$, operating frequency $f_o$ reaches zero at time $\tau_3$.

In addition to the system and method described above, according to another aspect of the invention, a table of compensation angle δ values may be generated that is used during a load stopping procedure. To this end, referring again to FIG. 8, during the commissioning process to identify value δ, there are several intermediate times between $\tau_3$ and $\tau_4$ during which, as value δ is decreased, deceleration levels off at intermediate levels. For instance, between times $\tau_5$ and $\tau_6$, with a first value $\delta_1$, deceleration levels off, between times $\tau_5$ and $\tau_6$ with a second value $\delta_2$, deceleration may again level off and so on. In FIG. 8, there are five separate δ values $\delta_1$–$\delta_5$ between times $\tau_3$ and $\tau_4$. Here, the frequencies at which deceleration levels off and corresponding δ values may be stored in a table form and used to activate the δ compensation feature differently at different operating frequencies to increase the level of control during stopping.

Figure 10:
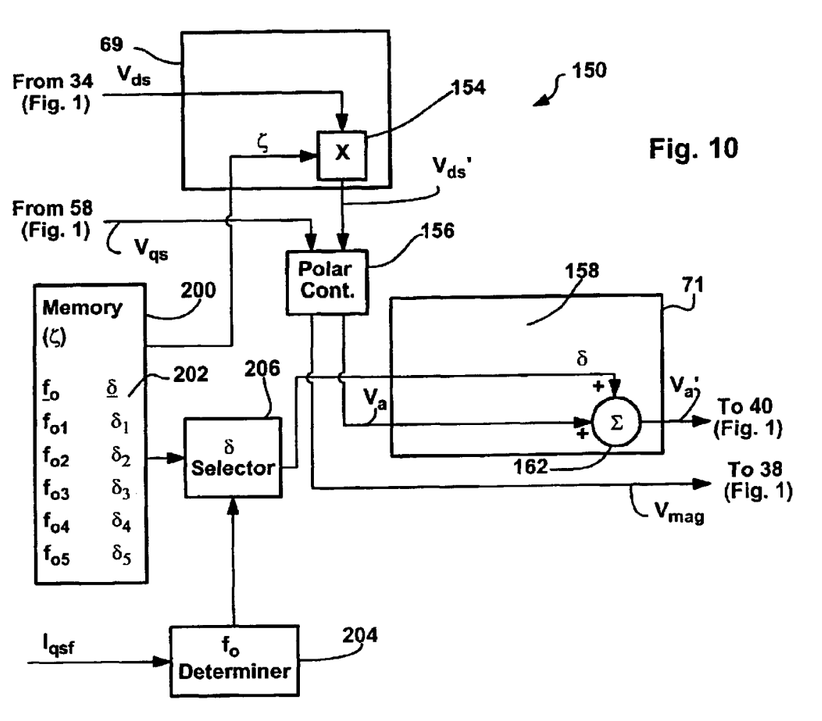
FIG. 10 is similar to FIG. 5, albeit illustrating a second embodiment of various components.

In this regard see FIG. 10 that illustrates one additional embodiment including a memory 200 having, in addition to the ζ value, a δ-frequency table 202. In addition to including the enhanced memory 200, FIG. 10 also includes a determiner 204 that uses the q-axis current value $I_{qsf}$ to identify instantaneous operating frequency and a δ selector 206. Selector 206 is linked to each of memory 200 and determiner 204. In this embodiment, during the commissioning procedure, once deceleration stops, the frequency of at which the deceleration stopped is stored as first frequency $f_{o1}$. For instance, the frequency $f_{o1}$ may be 5 Hz. Next, a first small δ value (e.g., $\delta_1$) is correlated with the first frequency $f_{o1}$ and stored therewith. The first value $\delta_1$ is then provided as an intermediate compensation angle to be added to the voltage phase angle to generate a compensated voltage phase angle which is in turn used to drive the motor.

Again, the operating frequency is monitored and the frequency at which deceleration stops is determined and stored as a second frequency $f_{o2}$ (e.g., 3 Hz). Thereafter, the magnitude of first compensation value δ1 is increased to generate the second value $\delta_2$ which is again used to modify the voltage phase angle and to drive the motor. The second value $\delta_2$ is correlated and stored with the second frequency $f_{o2}$. This process is repeated until the operating frequency is zero and complete δ-$f_o$ table 202 has been constructed.

Referring still to FIG. 10, components labeled with identical numbers in FIGS. 10 and 5 have similar operations and therefore are not again explained here in detail. During normal operation with the FIG. 10 components added to the FIG. 1 components, frequency determiner 204 uses q-axis feedback current $I_{qsf}$ to identify an instantaneous operating frequency $f_o$. Selector 206 uses the instantaneous operating frequency $f_o$ to identify a corresponding δ value in table 202 to be added to the polar angle $V_a$ to generate compensated value $V'_a$. Thus, using the components of FIG. 10, the δ value is adjusted when frequency of deceleration stalls and the stopping process is relatively soft.

It should be understood that the methods and apparatuses described above are only exemplary and do not limit the scope of the invention, and that various modifications could be made by those skilled in the art that would fall under the scope of the invention. For example, referring to FIG. 1 again, instead of adding angle δ between converter 36 and summer 38, the angle could be added after summer 38 or between integrator 42 and summer 38. Other modifications are contemplated.

To apprise the public of the scope of this invention, the following claims are made:

What is claimed is:

1. A method for use with a three phase AC motor controller linked to a three phase motor, the controller receiving a torque command signal and generating a voltage phase angle as a function of the torque command signal, the voltage phase angle in turn used to generate modulating waveforms to drive a PWM inverter that provides voltages on three motor supply lines, the method comprising the steps of:

during a commissioning procedure, identifying at least one compensation angle that, when mathematically combined with the voltage phase angle, drives the motor to zero operating frequency when a zero torque command is received; and during normal operation and when a zero torque command is received, mathematically combining the compensation angle and the voltage phase angle to generate a compensated phase angle and using the compensated phase angle to generate the modulating waveforms.

2. The method of claim 1 wherein the step of identifying a compensation angle includes driving the motor at a normal operating frequency, setting the torque command signal to zero, monitoring the motor frequency, when the motor stops decelerating, modifying the voltage phase angle until the motor frequency reaches zero and identifying the value by which the motor angle was modified to achieve the zero speed as the compensation angle.

3. The method of claim 2 further including the step of storing the compensation angle.

4. The method of claim 2 wherein the step of modifying the voltage phase angle includes, when deceleration stops:

a) determining the operating frequency;
   b) negating the operating frequency to generate a frequency error value;
   c) integrating the frequency error value to generate an instantaneous compensation angle;
   d) mathematically combining the instantaneous compensation angle and the voltage phase angle to generate a compensated phase angle;
   e) using the compensated phase angle to drive the motor; and
   f) repeating steps (a) through (a) until the operating frequency is zero.

5. The method of claim 4 wherein the step of mathematically combining the instantaneous compensation angle and the voltage phase angle includes adding the instantaneous compensation angle and the voltage phase angle.

6. The method of claim 1 wherein the step of modifying the phase angle includes modifying the phase angle whenever any torque command is received.

7. The method of claim 6 wherein the step of modifying includes adding the compensation angle to the voltage phase angle.

8. The method of claim 1 wherein, when the voltage phase angle is used to drive the motor and a zero torque command is received, motor deceleration stops at a first operating frequency, the method further including the step of identifying several intermediate compensation angles during the commissioning procedure, each intermediate compensation angle, when added to the voltage phase angle, causing the operating frequency deceleration to stop at a different operating frequency between a zero frequency and the first operating frequency and, wherein, the step of using the compensation angle includes using the several intermediate compensation angles to alter the voltage phase angle during normal operation when a zero torque command is received.

9. The method of claim 8 wherein the step of identifying the intermediate compensation angles includes, when deceleration stops:
a) determining when deceleration stops;
b) determining the operating frequency;
c) storing the operating frequency and the instantaneous compensation angle;
d) negating the operating frequency to generate a frequency error value;
e) increasing or decreasing the compensation angle;
f) adding the compensation angle and the voltage phase angle to generate a compensated phase angle;
g) driving the motor with the compensated phase angle; and
h) repeating steps (a) through (g) until the operating frequency is zero.

10. The method of claim 9 wherein the step of mathematically combining the compensation angle and the voltage phase angle to generate a compensated phase angle during normal operation further includes the steps of, after a zero torque command is received during normal operation, monitoring the operating frequency and, when the operating frequency reaches a frequency associated with one of the intermediate compensation angles, mathematically combining the associated intermediate compensation angle with the voltage phase angle to generate a compensated phase angle and using the compensated phase angle to drive the motor.

11. The method of claim 10 wherein the step of mathematically combining the associated intermediate compensation angle with the voltage phase angle includes adding the angles.

12. The method of claim 1 wherein the controller also generates d and q-axis voltage values as a function of the torque command signal and uses the d and q-axis voltage values to generate the voltage phase angle, the method also for altering the d-axis voltage value to compensate for the effects of supply line capacitive charge on the d-axis voltage, the method further including the steps of mathematically combining the d-axis voltage value with a compensation factor to generate a compensated d-axis voltage value and using the compensated d-axis voltage value along with the q-axis voltage value to generate the voltage phase angle.

13. The method of claim 12 further including the step of, prior to normal operation and during a commissioning procedure, identifying the compensation factor and storing the compensation factor for use during normal operation.

14. The method of claim 13 wherein the step of identifying the compensation factor includes driving the controller with a name plate current and measuring a first d-axis auto-tune voltage, identifying a no load d-axis current, driving the controller with the no load d-axis current and measuring a second d-axis auto-tune voltage and mathematically combining the first and second auto-tune voltages to generate the compensation factor.

15. The method of claim 14 wherein the step of mathematically combining the first and second auto-tune voltages includes the step of dividing the second d-axis auto-tune voltage by the first d-axis auto-tune voltage.

16. The method of claim 12 wherein the step of mathematically combining the d-axis voltage value with a compensation factor to generate a compensated d-axis voltage value includes multiplying the compensation factor and the d-axis voltage value to generate the compensated d-axis voltage value.

17. The method of claim 13 wherein, during the commissioning procedure, the step of identifying the compensation factor is performed prior to identifying the compensation angle and, wherein, the compensation factor is used to alter the d-axis voltage value during the procedure to identify the compensation angle.

18. The method of claim 1 wherein, when the voltage phase angle is used to drive the motor and a zero torque command is received, motor deceleration stops at a first operating frequency, the method further including the step of identifying several intermediate compensation angles during the commissioning procedure, each intermediate compensation angle, when added to the voltage phase angle, causing the operating frequency deceleration to stop at a different operating frequency between a zero frequency and the first operating frequency and, wherein, the step of using the compensation angle includes using the several intermediate compensation angles to develop a polynomial function indicating the relationship between the intermediate angles and the operating frequencies and using the polynomial function to determine compensation angles to alter the voltage phase angle during normal operation when a zero torque command is received.

19. An apparatus for use with a three phase AC motor controller linked to a three phase motor, the controller receiving a torque command signal and generating a voltage phase angle as a function of the torque command signal, the voltage phase angle in turn used to generate modulating waveforms to drive a PWM inverter that provides voltages on three motor supply lines, the apparatus comprising:
a processor running a program to perform the steps of:
during a commissioning procedure, identifying at least one compensation angle that, when mathematically combined with the voltage phase angle, drives the motor to zero operating frequency when a zero torque command is received; and
during normal operation and when a zero torque command is received, mathematically combining the compensation angle and the voltage phase angle to generate a compensated phase angle and using the compensated phase angle to generate the modulating waveforms.

20. The apparatus of claim 19 wherein the processor performs the step of identifying a compensation angle by driving the motor at a normal operating frequency, setting the torque command signal to zero, monitoring the motor frequency, when the motor stops decelerating, modifying the voltage phase angle until the motor frequency reaches zero and identifying the value by which the motor angle was modified to achieve the zero speed as the compensation angle.

21. The apparatus of claim 20 wherein the processor performs the step of modifying the voltage phase angle by, when deceleration stops:

a) determining the operating frequency;

b) negating the operating frequency to generate a frequency error value;

c) integrating the frequency error value to generate an instantaneous compensation angle;

d) mathematically combining the instantaneous compensation angle and the voltage phase angle to generate a compensated phase angle;

e) using the compensated phase angle to drive the motor; and f) repeating steps (a) through (e) until the operating frequency is zero.

22. The apparatus of claim 19 wherein the processor performs the step of modifying the phase angle by modifying the phase angle whenever any torque command is received.

23. The apparatus of claim 19 wherein the controller also generates d and q-axis voltage values as a function of the torque command signal and uses the d and q-axis voltage values to generate the voltage phase angle, the apparatus also for altering the d-axis voltage value to compensate for the effects of supply line capacitive charge on the d-axis voltage, the processor further performing the steps of mathematically combining the d-axis voltage value with a compensation factor to generate a compensated d-axis voltage value and using the compensated d-axis voltage value along with the q-axis voltage value to generate the voltage phase angle.

24. The apparatus of claim 23 wherein the processor further performs the steps of, prior to normal operation and during the commissioning procedure, identifying the compensation factor and storing the compensation factor for use during normal operation.

25. The apparatus of claim 24 wherein the processor performs the step of identifying the compensation factor by driving the controller with a name plate current and measuring a first d-axis auto-tune voltage, identifying a no load d-axis current, driving the controller with the no load d-axis current and measuring a second d-axis auto-tune voltage and mathematically combining the first and second auto-tune voltages to generate the compensation factor.

26. The apparatus of claim 25 wherein the processor performs the step of mathematically combining the first and second auto-tune voltages by dividing the second d-axis auto-tune voltage by the first d-axis auto-tune voltage.

27. The apparatus of claim 26 wherein the processor performs the step of mathematically combining the d-axis voltage value with a compensation factor to generate a compensated d-axis voltage value by multiplying the compensation factor and the d-axis voltage value to generate the compensated d-axis voltage value.

28. A method for use with a three phase AC motor controller linked to a three phase motor, the controller receiving a torque command signal and generating a voltage phase angle as a function of the torque command signal, the voltage phase angle in turn used to generate modulating waveforms to drive a PWM inverter that provides voltages on three motor supply lines, the method comprising the steps of:

during a commissioning procedure:
a) driving the motor at a normal operating frequency;
b) setting the torque command signal to zero;
c) monitoring the motor frequency and, when the motor stops decelerating:
  i) determining the operating frequency;
  ii) negating the operating frequency to generate a frequency error value;
  iii) integrating the frequency error value to generate an instantaneous compensation angle;
  iv) mathematically combining the instantaneous compensation angle and the voltage phase angle to generate a compensated phase angle;
  v) using the compensated phase angle to drive the motor; and
  vi) repeating steps (i) through (v) until the operating frequency is zero;
d) identifying the value by which the motor angle was modified to achieve the zero speed as a compensation angle; and during normal operation and when a zero torque command is received: e)
mathematically combining the compensation angle and the voltage phase angle to generate a compensated phase angle; and
f) using the compensated phase angle to generate the modulating waveforms.

29. The method of claim 28 wherein the step of modifying the phase angle includes modifying the phase angle whenever any torque command is received.

30. The method of claim 28 wherein the controller also generates d and q-axis voltage values as a function of the torque command signal and uses the d and q-axis voltage values to generate the voltage phase angle, the method also for altering the d-axis voltage value to compensate for the effects of supply line capacitive charge on the d-axis voltage, the method further including the steps of multiplying the d-axis voltage value by a compensation factor to generate a compensated d-axis voltage value and using the compensated d-axis voltage value along with the q-axis voltage value to generate the voltage phase angle.

31. The method of claim 30 further including the step of, prior to normal operation and during a commissioning procedure, identifying the compensation factor and storing the compensation factor for use during normal operation.

32. The method of claim 31 wherein the step of identifying the compensation factor includes driving the controller with a name plate current and measuring a first d-axis auto-tune voltage, identifying a no load d-axis current, driving the controller with the no load d-axis current and measuring a second d-axis auto-tune voltage and dividing the second d-axis auto-tune voltage by the first d-axis auto-tune voltage.

* * * * *

UNITED STATES PATENT AND TRADEMARK OFFICE
CERTIFICATE OF CORRECTION

PATENT NO. : 6,859,008 B1
DATED : February 22, 2005
INVENTOR(S) : Siebel It is certified that error appears in the above-identified patent and that said Letters Patent is hereby corrected as shown below:

Column 12,
Line 59, "(a) through (a)" should be -- (a) through (e) --.

Signed and Sealed this

Thirty-first Day of January, 2006

JON W. DUDAS
*Director of the United States Patent and Trademark Office*